United States Patent Office
3,384,456
Patented May 21, 1968

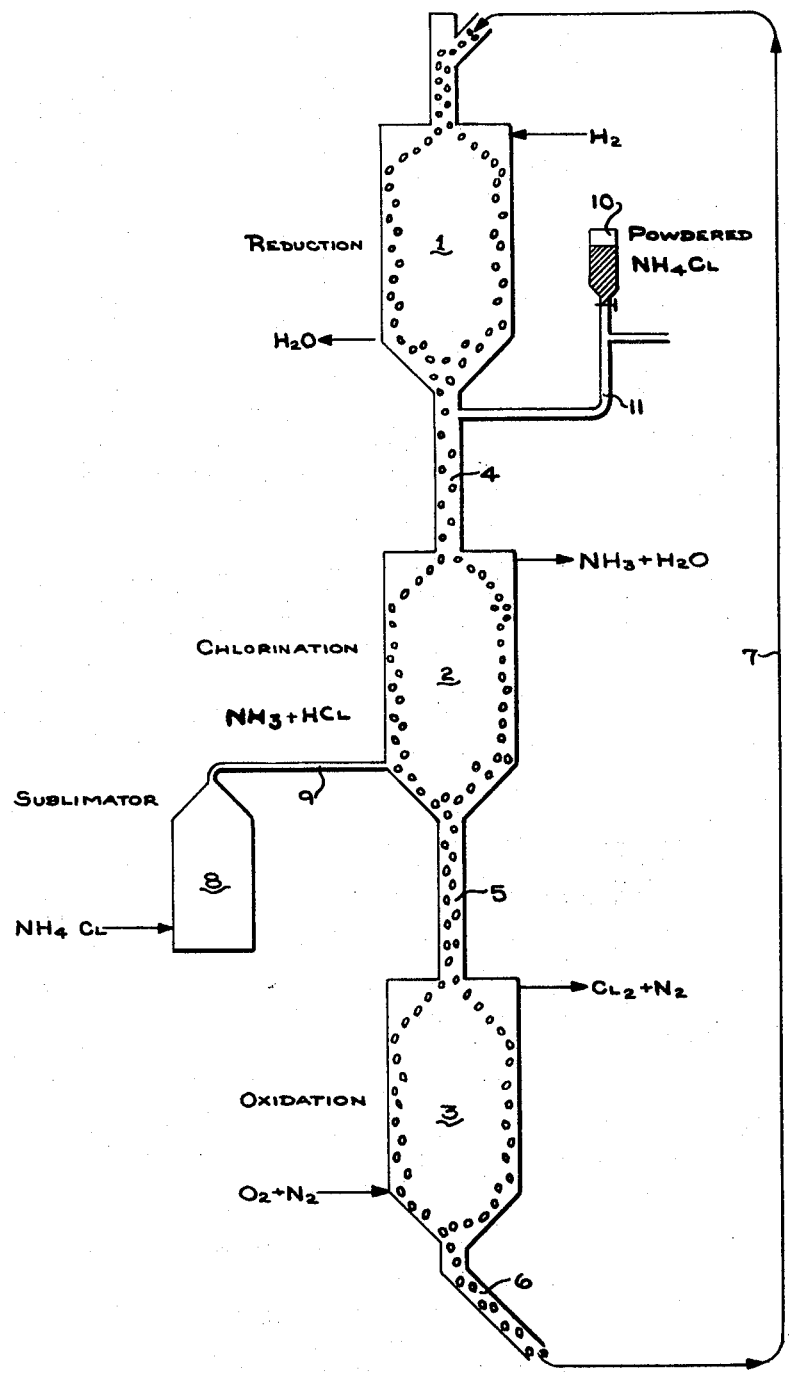

3,384,456
PROCESS FOR PRODUCING CHLORINE
Paul Metaizeau, Dombasle, France, assignor to
Solvay & Cie, Brussels, Belgium
Continuation-in-part of application Ser. No. 325,449,
Nov. 21, 1963. This application Sept. 19, 1967, Ser.
No. 671,921
Claims priority, application France, Nov. 30, 1962,
917,198, Patent 1,348,596
2 Claims. (Cl. 23—219)

ABSTRACT OF THE DISCLOSURE

The continuous production of chlorine from ammonium chloride by contacting the latter in a chlorination zone with heated contact masses prepared from oxides or chlorides of polyvalent metals and a promoter, moving by gravity flow sequentially through a reduction, a chlorination and an oxidation zone before being recycled, is improved by injecting in a finely divided solid form at least a part of the ammonium chloride into said moving granular mass at a point before said oxidation zone and at a rate such that the temperature of the mass is maintained at not substantially above 450° C.

CROSS REFERENCE TO RELATED APPLICATIONS

This application is a continuation-in-part of application Ser. No. 596,010, filed on November 21, 1966, and itself a streamlined continuation of application Ser. No. 325,449, filed on November 21, 1963, both now abandoned.

BACKGROUND OF THE INVENTION

This invention relates to an improved process for producing chlorine from ammonium chloride.

The preparation of chlorine by alternate chlorination and oxidation of oxides of polyvalent metals is well known. Processes of this type comprise, first, the passage of vapors of hydrogen chloride and/or ammonium chloride over or through solid masses containing suitable metallic oxides to form the corresponding metal chlorides, and then, in the second stage, the oxidation of these chlorides by oxygen or by air with the liberation of chlorine.

In the case of iron oxides, the fundamental reactions are as follows:

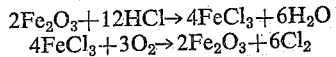

In practice it is difficult to obtain high yields and chlorine of high concentration because, at the temperatures necessary for the oxidation of the ferric chloride, the latter is very volatile and is therefore partly eliminated from the reaction zone before the desired reaction can take place. To remedy this disadvantage of the process, use is made of mixtures of ferric chloride and alkali chloride such as potassium chloride to lower the vapor pressure of the ferric chloride, a promoter consisting of cadmium chloride or copper chloride, and an inert support.

Increased yields are obtained by performing the successive chlorination and oxidation steps with the aid of moving beds of reactants. The reaction masses preferably circulate from above downwardly into superimposed chlorination and oxidation chambers in which the masses are traversed by counter-currents of hydrogen chloride and an oxygen-containing gas, respectively. Since the masses are continually recycled, good yields can be obtained even if the amount of conversion during each reaction is only small.

These processes, however, are not entirely suitable for the production of chlorine from ammonium chloride because if a mixture of ammonia and hydrogen chloride vapors resulting from the dissociation of ammonium chloride is passed over the reaction masses, the ammonia may be partly decomposed.

This decomposition, which is due to the presence in the reaction masses of oxides of the general formula $M_2O_3$, and especially of ferric oxide, can be prevented by introducing a third reaction stage in which the harmful oxides are reduced by a current of reducing gas such as hydrogen.

A process of this type can be realized by having the reaction masses circulate as movable beds in three superimposed chambers where successive reactions occur which correspond to the three stages of this process, namely, reduction, chlorination and oxidation.

When chlorine is produced from ammonium chloride by known methods, the ammonium chloride is introduced into the chlorination zone in the vaporous state. This ammonium chloride vapor, which can be obtained by sublimation in different types of sublimators, becomes dissociated under the conditions generally existing therein. Hydrogen chloride and ammonia in the free state then are present in the gas introduced into the chlorination zone.

SUMMARY OF THE INVENTION

The applicant has found that the ammonium chloride can be introduced in the solid state into the chlorination zone without thereby otherwise disturbing the process. Indeed, with the introduction of solid ammonium chloride the operation functions more easily and more economically.

The process of this invention therefore preferably consists of producing chlorine by bringing ammonium chloride into contact with reaction masses composed of a granular inert support impregnated with iron chloride, and a promoter such as copper chloride or cadmium chloride, and alkaline chlorides such as potassium chloride, the reaction masses flowing by gravity through the superimposed reaction zones in which the reduction, the chlorination and the oxidation of the masses occurs, at least a portion of the ammonium chloride being introduced in the solid state directly in the middle of the moving masses ahead of the oxidation phase.

Stated more specifically, the present invention is to be applied in a cyclic process for the production of chlorine from ammonium chloride by contact with moving reaction masses composed of an inert granular support impregnated with polyvalent metal compounds selected from the group consisting of oxides of chromium, manganese, iron, nickel and cobalt, and chlorides thereof, an alkali metal chloride, and a promoter selected from the group consisting of oxides and chlorides of cadmium and copper. The inert granular support is in the form of impregnated granules which flow by gravity through superimposed reaction zones in such a manner that the following reactions successively occur: reduction of the metal compounds at a temperature ranging from 400° to 550° C. by a reducing gas circulating in parallel current flow with the direction of flow of the metal compounds; chlorination of the polyvalent metal compounds at a temperature ranging from 350° to 500° C. by vapors of ammonium chloride circulating in counter-current flow to the moving reaction masses; and oxidation of the chlorinated granular metal compounds at a temperature ranging from 400° to 550°C. by counter-current contact with an oxygen-containing gas, accompanied by recovering the chlorine from the oxidation step and returning the oxidized metal compounds to the reduction zone. The improvement according to the present invention comprises introducing in finely divided form at least a portion of the ammonium chloride in the solid state directly into the moving granular reaction zone before the oxidation phase, the solid ammonium chloride being introduced uniformly into the moving granular reaction mass in an amount sufficient to reduce the temperature of the moving granules to a temperature of not substantially in excess of 450° C. According to a specific feature of the present invention, the finely divided ammonium chloride is introduced into the moving granular reaction zone by way of a conduit connecting those reaction zones in which the reduction and chlorination reactions take place.

This procedure has important economic advantages in the exploitation of a process for the manufacture of chlorine from ammonium chloride. It also renders the operation of such a process technically more satisfactory because it permits operation at temperatures that are more suitable for these reactions.

In fact, the vapors of ammonium chloride which are formed directly in the middle of the flowing masses by contact of the solid ammonium chloride with the hot masses will react in the same manner as the vapors formed in a separate annexed sublimator and will serve the same purpose without any losses.

The injection of solid ammonium chloride therefore permits a corersponding reduction of the apparatus required for sublimation. The latter can then be of smaller dimensions than would be required if it had to deliver all the ammonium chloride that is required for the production of chlorine. This will make the apparatus less expensive to set up and more economical in its operation.

Obviously, the amount of ammonium chloride that can be injected in its solid state and sublimed directly in the flowing masses depends on the amount of available heat. The latter depends, on the other factors involved in the operation and in particular, on the heat losses in the reactors, the temperature of the gas introduced, and on the speed with which the process is operated.

In general, the advantages realized by this invention are in proportion to the size of the installation. Under certain conditions it is possible to omit completely the additional apparatus for subliming ammonium chloride, all of its being introduced in the solid state.

Furthermore, the injection of solid ammonium chloride can be accomplished in such a way that it will not interfere with the functioning of the apparatus. It is necessary for this purpose to inject the ammonium chloride in a finely divided condition and to distribute it uniformly. The heat exchanges with the hot masses will then occur under optimum conditions.

To assist in the dispersion of the powdered solid, it is injected into the flowing masses where their velocity is at a maximum, for example, into the restricted space between two reaction zones.

The point of injection of the solid ammonium chloride can be located at the entrance or in the middle of the chlorination zone so that the hydrogen chloride which results from the dissociation of the vaporized ammonium chloride can react effectively with the granules. For this purpose it is essential that the point of injection be not too close to the gas outlet from the chlorination zone because then the generated vapors may not have sufficient time to be completely reacted.

The injection is preferably into the upper portion of the narrow tube connecting the reduction zone and the chlorination zone, the pressure in this tube being regulated in such a manner that the gas necessarily flows toward the chlorination zone.

When carried out in this manner, the injection of solid ammonium chloride exercises a favorable influence on the functioning of the apparatus for the production of chlorine, since it permits the establishment of an optimum temperature range in the reaction zones.

Such an optimum range requires the chlorination temperatures to be lower than the reduction and oxidation temperatures. The latter reactions occur readily at 500° C. or at even higher temperatures while chlorination occurs better at lower temperatures of about 400° to 450° C.

It is evident that in an installation traversed continually by the reaction masses, the temperatures of the different zones are closely dependent on one another. The thermal losses of the reactors and the heats of reaction determine the temperautre changes in the middle of the zone. On the other hand, the temperature at which the reaction masses enter a zone is practically that of the reaction masses leaving the zone immediately above. Even the recirculation of the granules does not appreciably diminish their temperature.

When the process is operated with ammonium chloride vapors formed in a separate apparatus annexed thereto, the temperature in the chlorination zone can not be reduced to below 490° C. This temperature, however, is definitely too high for the chlorination reaction because the yield is then reduced by decomposition of the gaseous products. Corrosion problems at these temperatures are also serious and the losses of active salts are considerable.

A cooling of the reaction masses between the reduction and chlorination zones is sometimes desirable to improve operating conditions. Such cooling can be accomplished by known methods, but is generally difficult.

An especially efficient method of effecting such cooling is by the injection of solid ammonium chloride. The latent heat of vaporization of solid ammonium chloride is very great which makes the cost of vaporizing it in a separate vaporizer quite high, but with the injection of solid ammonium chloride this high latent heat of vaporization actually becomes an advantage.

The injection of solid ammonium chloride permits excellent cooling of the reaction masses and brings the temperature inside the chlorination zone down to below 450° C., which greatly improves the operating conditions.

The injection of finely divided ammonium chloride can be accomplished with any suitable type of apparatus, but an air lift injector is especially advantageous. It can be coupled with an alkali chloride injector for recharging the reaction masses with active reactants. The injected powdered solid is then a mixture of an alkali chloride such as potassium chloride, and ammonium chloride.

BRIEF DESCRIPTION OF THE DRAWING

The single drawing figure is a simplified elevational view of one type of apparatus for carrying out the process according to the present invention.

DESCRIPTION OF THE PREFERRED EMBODIMENTS

The results of the experiments shown below are cited for the purpose of illustrating our improved process for producing chlorine from ammonium chloride, using the apparatus shown schematically in the annexed drawing. It is to be understood, however, that our invention is not limited to the particular conditions or form of apparatus shown.

A suitable apparatus for the production of chlorine from ammonium chloride by our process is formed of three superimposed reaction chambers which are traversed successively and continuously by granular contact masses impregnated by active elements: namely, a reduction chamber 1, a chlorination chamber 2, and an oxidation chamber 3.

These three chambers are provided with means for introducing and withdrawing gases, and are connected with on another by narrow conduits 4 and 5 to permit granules of reaction masses to descend successively through the three chambers. At the outlet 6 from the oxidation chamber 3 the granules are received by an elevator 7, which can be an air lift or a mechanical elevator, and are delivered to the top of the installation to be reintroduced into the reduction chamber 1.

A portion of the ammonium chloride, which is introduced into the chlorination chamber 2, is obtained from the sublimator 8 and the vapors are injected through conduit 9.

The remaining portion of the ammonium chloride is stored in the reservoir 10 and is injected as a powder directly into the moving reaction masses by means of an air lift 10 connected to the upper part of tube 4 which connects the reduction and the chlorination chambers.

The following table gives the operating conditions for different rates of injection of solid ammonium chloride, the reaction masses moving at the rate of 800 liters per hour.

TABLE

| $NH_4Cl$ solid injected, kg./hr. | $NH_4Cl$ vapor injected, kg./hr. | Temperature (° C.) of— | | | $NH_4Cl$ in the gas, kg./hr. |
|---|---|---|---|---|---|
| | | Reduction | Chlorination | Oxidation | |
| | 65 | 505 | 495 | 590 | [1]3 |
| 1 | 64 | 505 | 490 | 585 | [1]3 |
| 4 | 61 | 505 | 480 | 575 | [1]2 |
| 8 | 56 | 505 | 465 | 555 | [1]2 |
| 13 | 50 | 505 | 435 | 530 | <1 |
| 16 | 48 | 505 | 425 | 520 | <1 |

[1] Approximately.

The results given in the table clearly show that the introduction of solid $NH_4Cl$ into the middle of the moving reaction masses makes it possible to use a more economical sublimation installation and at the same time to operate at more favorable working temperature conditions in the installation. This introduction of solid $NH_4Cl$ does not cause any greater loss of that material but increases the yield of chlorine therefrom.

It will be understood that the above description of the present invention is susceptible to various modifications, changes and adaptations, and the same are intended to be comprehended within the meaning and range of equivalents of the appended claims.

I claim:
1. In a cyclic process for the production of chlorine from ammonium chloride by contact with moving reaction masses composed of an inert granular support impregnated with polyvalent metal compounds selected from the group consisting of oxides of chromium, manganese, iron, nickel and cobalt, and chlorides thereof, an alkali metal chloride, and a promoter selected from the group consisting of oxides and chlorides of cadmium and copper, said support being in the form of impregnated granules flowing by gravity through superimposed reaction zones in such a manner that the following reactions successively occur:
   (a) reduction of the said metal compounds at a temperature ranging from 400° to 550° C. by a reducing gas circulating in parallel flow with the direction of flow of the metal compounds;
   (b) chlorination of said polyvalent metal compounds at a temperature ranging from 350° to 500° C. by vapors of ammonium chloride circulating in counter-current flow to the moving reaction masses; and
   (c) oxidation of the said chlorinated granular metal compounds at a temperature ranging from 400° to 550° C. by counter-current contact with an oxygen-containing gas and recovering the chlorine from said oxidation step and returning said oxidized metal compounds to said reduction zone;
the improvement which comprises introducing in finely divided form at least a portion of the said ammonium chloride in the solid state directly into the moving granular reaction zone before the said oxidation phase, said solid ammonium chloride being introduced uniformly into the moving granular reaction mass in an amount sufficient to reduce the temperature of said moving granules to a temperature of not substantially in excess of 450° C.

2. The process of claim 1, wherein the said finely divided ammonium chloride is introduced into the said moving granular reaction mass in the conduit connecting the reaction zones in which the reduction and chlorination reactions take place.

References Cited

UNITED STATES PATENTS

| 2,206,399 | 7/1940 | Grosvenor et al. | 23—219 |
| 2,451,870 | 10/1948 | Richardson et al. | 23—219 |
| 2,577,808 | 12/1951 | Pye et al. | 23—219 |
| 3,103,419 | 9/1963 | Hunter et al. | 23—219 |
| 3,135,584 | 6/1964 | Brooks et al. | 23—219 |

OSCAR R. VERTIZ, *Primary Examiner.*

E. STERN, *Assistant Examiner.*